July 10, 1934.  A. T. STUART  1,965,813
METHOD AND APPARATUS FOR THE PURIFICATION OF THE OXYGEN AND HYDROGEN
RESULTING FROM THE ELECTROLYTIC DECOMPOSITION OF WATER
Filed April 22, 1930
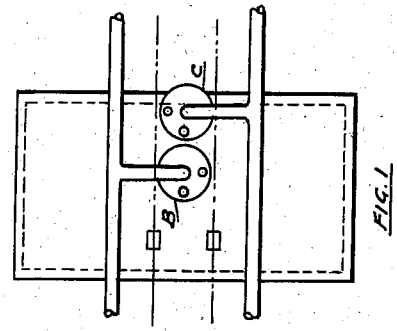
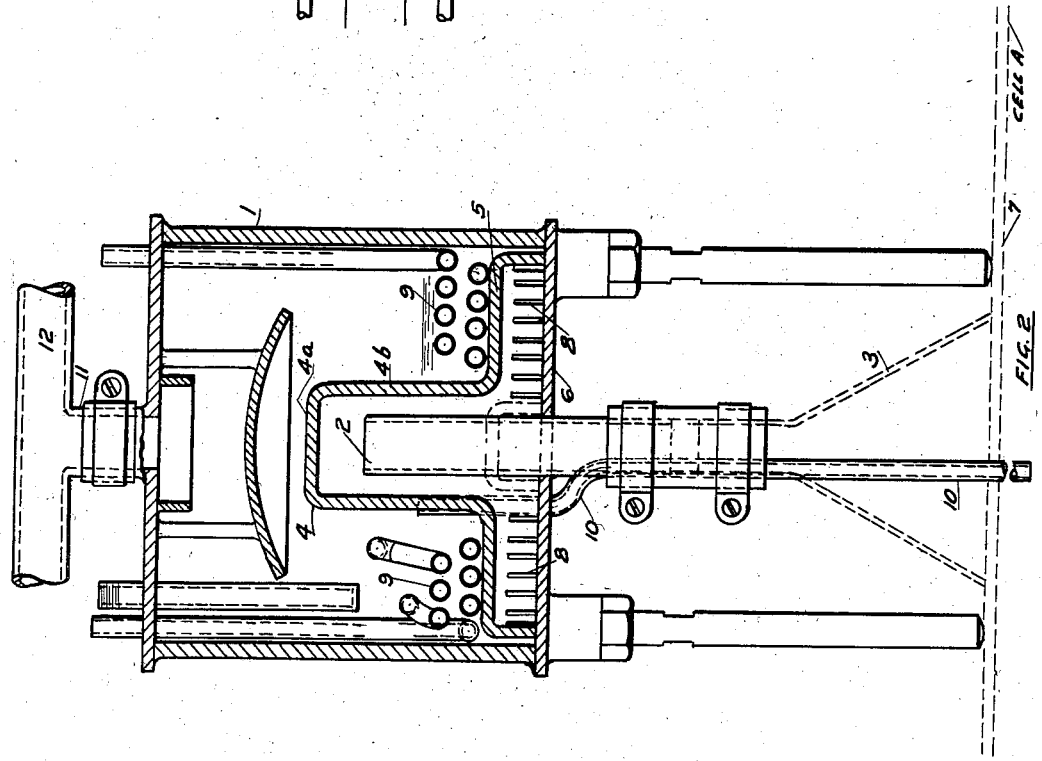
Inventor:
Alexander T. Stuart Patented July 10, 1934

1,965,813

UNITED STATES PATENT OFFICE

1,965,813

METHOD AND APPARATUS FOR THE PURIFICATION OF THE OXYGEN AND HYDROGEN RESULTING FROM THE ELECTROLYTIC DECOMPOSITION OF WATER

Alexander Thomas Stuart, Toronto, Ontario, Canada

Application April 22, 1930, Serial No. 446,310

8 Claims. (Cl. 204—5)

In the electrolytic decomposition of water it is known that hot gases issuing from the cells are saturated to a greater or less extent with entrained materials such as caustic spray and water evaporated by the electrolysis. It is also known that this saturation, in some cases, amounts to more than the water decomposed, and that the caustic soda carried in the hot gases averages 5%, by weight, of the water evaporated. Although the water and caustic spray carried out of the cells with the hot gases have heretofore been recovered, it is not known that they have previously been returned to each cell in the exact ratio in which they were carried out, and consequently it has been necessary to maintain a constant supervision of the cells for ensuring a uniform strength and maximum level of the electrolyte throughout the battery.

This invention relates to a method for the electrolytic decomposition of water in a tank or separate unit type of cell wherein the gas from each cell is treated prior to its admixture with the same gas from other cells, by collecting as a condensate the caustic spray and evaporated water given off with the gas, refrigerating the condensate, utilizing a portion of it for scrubbing, cooling and drying the gas issuing from the same cell and returning the excess of the condensate to the cell from which it issued. In the practical operation of the cell the oxygen is passed through a body of refrigerated liquid interposed between the oxygen offtake of the cell and the manifold connecting the oxygen offtakes of a battery of cells, and likewise the hydrogen from each cell is passed through another body of refrigerated liquid interposed between the hydrogen offtake of the cell and the manifold connecting the hydrogen offtakes of a battery of cells and the water evaporated from the cell and the caustic spray entrained with the gas issuing from the cell are collected, liquified, refrigerated, and utilized as the refrigerated liquid through which the gas is passed and by which it is scrubbed, cooled, and dried.

To this end each cell is provided with a pair of gas scrubbers, one connected with the oxygen offtake and the other connected with the hydrogen offtake. Each scrubber comprises a purifying chamber of ample capacity for the cell output, a pipe connected with the gas offtake of the cell and extending into the purifying chamber, above the level of the condensate, a baffle for preventing the gas issuing direct from the pipe into the purifying chamber and deflecting it together with the entrained materials, such as caustic spray and evaporated water carried out of the cell by it, into the condensate.

For an understanding of the invention reference is to be had to the following description and to the accompanying drawing, in which, Fig. 1 represents diagrammatically a plan view of an apparatus suitable for carrying out the invention, and, Fig. 2 is a vertical section of the gas scrubber.

Like characters of reference refer to like parts throughout the specification and drawing.

The gas scrubber comprises a purifying chamber 1 proportioned to the capacity of the cell A and provided with an inlet pipe 2 connected with the cell offtake 3. The inlet pipe extends approximately to the middle of the purifying chamber and is enclosed by a baffle 4, comprising a top 4a which overhangs and is spaced from the mouth of the pipe 2, a cylindrical wall 4b concentric with the pipe and spaced from it, and an apertured base 5 seated upon the bottom 6 of the purifying chamber and extending from the cylindrical wall 4b to the wall of the scrubber. The hot gas passes from the cell 7 through the offtake 3 and inlet pipe 2, to the scrubber, and when it issues from the mouth of the inlet pipe it is deflected by the baffle 4 to the bottom of the purifying chamber, and passes from the interior of the baffle through the apertures 8 in the base 5. The caustic spray and evaporated water carried out of the cell by the gas are trapped by the baffle and collected at the bottom of the purifying chamber as a condensate of the gas, and this collection maintains a body of liquid which is utilized for the scrubbing of the gases. To cool this liquid the purifying chamber is provided with a heat exchange in the form of refrigerating pipes 9 through which may be pumped cold air or a refrigerant liquid. Within the purifying chamber and extending from above the level of the pipes 9 to the cell 7 is an overflow pipe 10 which returns the excess condensate to the cell from which it issued. The cooled condensate not only scrubs the gas and removes the adhering caustic spray and evaporated water, but it also cools and dries the gas so that when the latter enters the purifying chamber above the condensate it is in a cool, dry, condition, free from caustic. At the top of the purifying chamber is an outlet 11, connected with a manifold 12 coupling together all the scrubbers for the same gas.

The cell shown in the drawing is provided with two scrubbers B and C. The scrubber B is connected with the oxygen offtake of the cell, and the scrubber C is connected with the hydrogen offtake of the cell. These scrubbers are of the same construction as above described and the oxygen passes from each cell through its respective offtake to its corresponding scrubber, and through the body of refrigerated liquid interposed between the oxygen offtake of the cell and the manifold connecting the offtakes of a battery of cells; and likewise the hydrogen from each cell passes through its respective offtake to its corresponding scrubber and through the body of refrigerated liquid interposed between the hydrogen offtake of the cell and the manifold connecting the hydrogen offtakes of a battery of cells.

Having thus fully described my invention what I claim as new and desire to secure by Letters Patent is:

1. In the electrolytic decomposition of water a gas scrubber comprising a purifying chamber, an inlet pipe connected with the cell offtake and extending within the purifying chamber, a baffle enclosing the inlet pipe within the purifying chamber, said baffle comprising a top which overhangs and is spaced from the mouth of the pipe, a cylindrical wall concentric with and spaced from it, an apertured base extending from the cylindrical wall and seated upon the bottom of the purifying chamber, refrigerant pipes within the purifying chamber, a refrigerant fluid within said pipes, an overflow pipe within the purifying chamber above the level of the refrigerant pipes for returning the excess condensate to the cell from which it issued, and an outlet at the top of the purifying chamber connected with a manifold coupling together all the scrubbers for the same gas from the battery of cells.

2. A method for the electrolytic decomposition of water in a tank or separate unit type of cell wherein the gas from each cell is treated prior to its admixture with the same gas from other cells which comprises passing the gas and entrained materials from the cell to a refrigerated liquid for scrubbing the gas of the entrained materials, collecting the entrained materials as a condensate, refrigerating the condensate, utilizing a portion of it as the refrigerated liquid for scrubbing the gas issuing from the same cell and returning the condensate to the cell from which it issued in the same ratio in which it was carried out.

3. A method for the electrolytic decomposition of water in a tank or separate unit type of cell wherein the gas from each cell is treated prior to its admixture with the same gas from other cells, which comprises passing the gas and entrained materials from the cell to a refrigerated liquid formed by collecting the entrained materials as a condensate, refrigerating the condensate and utilizing it for scrubbing the gas issuing from the same cell for recovering therefrom any solute or moisture entrained with the gas and returning the excess of the condensate to the cell from which it issued in the same ratio in which it was carried out thereby maintaining the solute of the electrolyte at substantially constant strength.

4. A cyclic method for maintaining the strength of the electrolyte in an electrolytic cell substantially constant, comprising the step of treating gas from each cell, prior to its admixture with the same gas from other cells, for the recovery of the solute entrained with the gas, which consists of collecting the moisture and solute entrained with the gas as an aqueous solution and returning the solution to the cell from which the solute issued in substantially the same ratio as the solute was carried out.

5. A cyclic method for maintaining the strength of the electrolyte in an electrolytic cell substantially constant, comprising the step of treating gas from each cell, prior to its admixture with the same gas from other cells for the recovery of the solute entrained with the gas, which consists of collecting the moisture and solute entrained with the gas as a body of condensate, passing the gas through the said body of condensate for recovering therefrom any entrained solute and returning the excess of the body of condensate with the recovered solute to the cell from which the solute issued and in substantially the same ratio the solute was carried out.

6. A cyclic method for maintaining the strength of the electrolyte in an electrolytic cell substantially constant comprising the step of treating gas from each cell, prior to its admixture with the same gas from other cells, for the recovery of the solute entrained with gas, which consists of collecting the moisture and solute entrained with the gas as a body of condensate, refrigerating the condensate, passing the gas through the refrigerated body of condensate for recovering therefrom most of the moisture and any of entrained solute and returning the excess of the body of condensate with the recovered solute to the cell in substantially the same ratio as they were carried out.

7. A gas scrubber for purifying gas from an electrolytic cell prior to its admixture with gas from other cells, comprising a purifying chamber, conduit means for conducting the gas from the off-take of the cell to the bottom of the purifying chamber, said conduit means being adapted to prevent any liquid condensate within the chamber flowing back to the cell through the said conduit means, an overflow conduit above the bottom of the chamber for returning excess liquid condensate to the cell from which it issued and a gas outlet conduit above the overflow conduit connected with a manifold coupling together the gas outlets from all the scrubbers for the same gas from a battery of cells.

8. A gas scrubber for purifying gas from an electrolytic cell prior to its admixture with gas from other cells, comprising a purifying chamber, conduit means for conducting the gas from the off-take of the cell to the bottom of the purifying chamber, said conduit means being adapted to prevent any liquid condensate within the chamber flowing back to the cell through the said conduit means, an overflow conduit above the bottom of the chamber for returning excess liquid condensate to the cell from which it issued, a water cooled surface within the chamber below the overflow conduit, and a gas outlet conduit above the overflow conduit connected with a manifold coupling together the gas outlets from all the scrubbers for the same gas from a battery of cells.

ALEXANDER T. STUART.